H. G. CORDLEY.
FAUCET.
APPLICATION FILED JUNE 25, 1908.

964,615.

Patented July 19, 1910.

Witnesses
Albert Popkins
R. N. Flint

Inventor
Henry G. Cordley
By A. P. Greeley
Attorney

THE NORRIS PETERS CO., WASHINGTON, D. C.

UNITED STATES PATENT OFFICE.

HENRY GREELEY CORDLEY, OF GLEN RIDGE, NEW JERSEY.

FAUCET.

964,615.     Specification of Letters Patent.     Patented July 19, 1910.

Application filed June 25, 1908. Serial No. 440,275.

*To all whom it may concern:*

Be it known that I, HENRY G. CORDLEY, a citizen of the United States, residing at Glen Ridge, in the county of Essex, State of New Jersey, have invented certain new and useful Improvements in Faucets, of which the following is a description, reference being had to the accompanying drawings, forming a part hereof.

My invention relates to improvements in faucets or valves designed to control the flow of water or other liquid from a receptacle, and my improved faucet is designed with special reference to use with water coolers to control the flow of water therefrom.

The object of my invention is to provide a faucet or valve for the purpose above specified which shall be pleasing and attractive in appearance, which may be readily and cheaply manufactured by approved mechanical processes, which is of simple construction, which may readily be repaired in case its operative parts become worn so as to be unserviceable, and which will be effective for the purpose for which it is designed.

With the above mentioned objects in view, my invention consists in the improved faucet illustrated in the accompanying drawing, described in the following specification, and particularly claimed in the clauses of the concluding claim.

Figure 2:
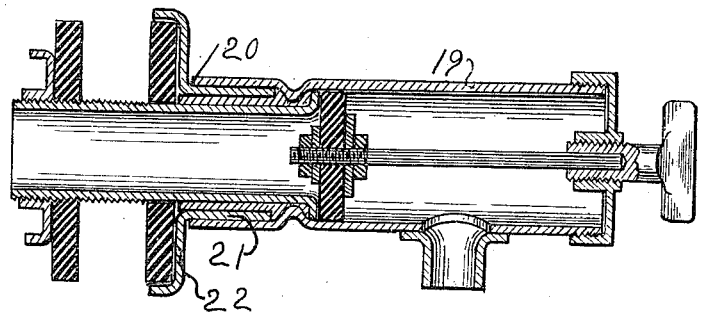
Figure 1:
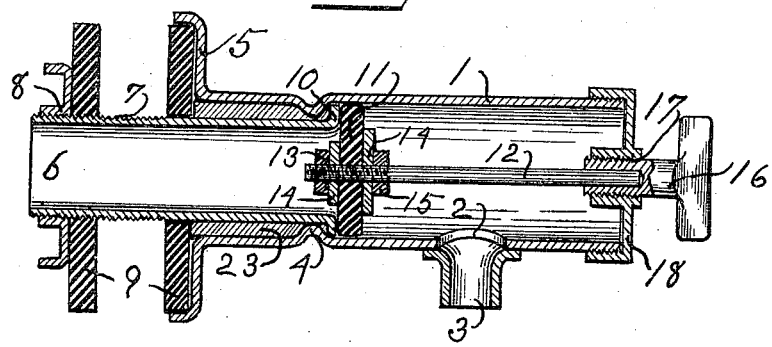

In the drawing, Figure 1 is a longitudinal sectional view of an embodiment of my invention in its preferred form, and, Fig. 2 is a similar view in which certain of the parts are shown as of slightly modified form, the modifications relating to method of manufacture rather than to form of the finished faucet.

Referring to Fig. 1 of the drawing, 1 is the exterior casing of my improved faucet, which casing is made from a section of thin metallic tubing which may be readily purchased in the open market. This casing is provided with an opening at 2, over which a discharge spout 3 is secured in any suitable manner as by soldering, brazing, or riveting said spout to the casing.

The casing 1 is reduced in size at 4, whereby an inwardly extending bead or projecting ledge is produced which extends circumferentially of the casing 1; and the casing 1 is expanded at 5 to form a seat for a packing washer which will be in contact with the outer wall of the receptacle with which the faucet is used. The reduction in size of the casing 1 to form the bead 4, and the expansion thereof to form the seat 5, may be accomplished by the process of spinning, upsetting, rolling, or other mechanical process performed upon the section of tubing from which the said casing is made.

6 is a nipple preferably formed also from thin metallic tubing and provided with threads at 7 and with a nut 8 and with rubber or other elastic washers 9, whereby the faucet may be secured to the receptacle with which it is used. This nipple 6 is of sufficient length to extend within the exterior casing 1 into the vicinity of the bead 4, and the inner end of said nipple 6 is provided with an outwardly extending flange, which flange may be produced by expanding the inner end of the nipple 6 and turning a portion thereof outward at substantially a right angle to the main portion, as shown at 10, to thereby form a valve seat for the valve 11 as will be understood from the drawing. It will be seen that the outwardly turned end 10 of the nipple 6 rests against the inwardly extending bead 4, whereby the nipple is securely retained in place, and it will be understood that in assembling the parts the nipple is inserted into the casing 1 from the right hand end thereof and pushed into proper position with the flange 10 in engagement with the right hand surface of the inwardly extending bead 4.

The nipple 6 having been placed in proper position within the casing 1 with its outwardly turned flange 10 in engagement with the outer or right hand surface of the bead 4, the casing and nipple are in the preferred form of my invention secured together into a single unitary member as by filling the intervening spaces with solder, as indicated at 23, whereby a tight joint is secured and the parts effectively and firmly joined together.

The valve seat formed by the outwardly turned portion 10 of the nipple 6 may, if found desirable, be faced by means of a suitable tool after the parts have been secured together by solder as aforesaid.

The valve 11 previously referred to is secured to a stem 12 by means of a nut 13, washers 14 being provided to bear against either surface of the valve 11, and one of them resting against a shoulder upon the stem 12, which shoulder is shown as in the form of a nut 15. By this construction it will be seen that the valve 11 may be easily removed when it becomes worn, and a new valve substituted therefor.

The valve stem 12 is rigidly secured to an operating handle 16 which is threaded at 17 and in engagement with a threaded opening in a cap 18 which closes the outer end of the casing 1. The threaded portion 17 of the operating handle 16 will be seen to be materially larger than the valve stem 12, whereby after the said threaded portion is disengaged from the threaded opening in the cap 18 the stem 12 may be readily moved longitudinally to withdraw the valve 11 from its seat.

It is intended that the valve 11 shall be of substantially the same diameter as the interior of the casing 1, so that after the threads of the handle disengage the threaded opening in the cap 18 the valve will have to be moved to the right until it passes the opening 2 before any considerable flow takes place through the faucet. This, however, is an advantage as a more tightly fitting valve and one less likely to leak is thereby procured, and the valve may be very quickly and conveniently operated as the threaded portion 17 of the operating handle is comparatively short so that the operating handle may be readily freed from the cap 18 and the valve moved outwardly.

In the modified form of my improved faucet shown in Fig. 2 I have illustrated a seat for the outer packing washer as formed in a different manner from that above disclosed, and, as the modification relates solely to this feature and all the other parts and their mode of operation are the same as above described with reference to Fig. 1, I will omit all description of other parts in referring to this modification. In the modified form the casing 19 terminates at 20, and is not expanded to form a seat for a packing washer. The seat for the washer is formed separate from the body portion 19, and comprises a bushing 21 fitting within the casing 19 and having an expanded portion 22 to form a seat for one of the packing washers. This bushing may be formed by stamping from blanks cut from a piece of thin sheet metal, or from a section of tubing, and it fits somewhat loosely within the end of the casing 19 as shown. In assembling the parts of this modified form the casing, nipple, and bushing are secured together into a single unitary structure by means of solder as above described with reference to Fig. 1.

Having thus described my invention and explained the mode of operation thereof, I claim and desire to secure by Letters Patent:—

1. In a faucet, a tubular casing; an inwardly projecting bead formed in the wall of said casing intermediate its ends and extending circumferentially thereof; a nipple whereby said casing may be secured to a receptacle, the inner end of said nipple extending within said casing and having an outwardly projecting flange one surface of which is in engagement with said bead and the other surface of which forms a valve seat; and an outwardly opening valve coöperating with said seat.

2. In a faucet, a tubular casing; an inwardly projecting bead formed in the wall of said casing intermediate its ends and extending circumferentially thereof; a nipple whereby said casing may be secured to a receptacle, the inner end of said nipple extending within said casing and having an outwardly projecting flange one surface of which is in engagement with said bead and the other surface of which forms a valve seat; a bushing fitting within said casing and provided with an expanded portion at its inner end to form a seat for a packing washer; and an outwardly opening valve coöperating with said seat.

3. In a faucet, a tubular casing; an inwardly projecting bead formed in the wall of said casing intermediate its ends and extending circumferentially thereof; a nipple whereby said casing may be secured to a receptacle, the inner end of said nipple extending within said casing and having an outwardly projecting flange one surface of which is in engagement with said bead and the other surface of which forms a valve seat; a bushing fitting within said casing and provided with an expanded portion at its inner end to form a seat for a packing washer, said bushing, nipple and casing being secured together as by solder to thereby form a single unitary structure; and an outwardly opening valve coöperating with said seat, the diameter of said valve being substantially the same as the internal diameter of said casing.

4. In a faucet, a tubular casing; a bead projecting inwardly from the wall of said casing intermediate its ends; a nipple whereby said casing may be secured to a receptacle, the inner end of said nipple extending within said casing and having an outwardly projecting flange one surface of which is in engagement with said bead and the other surface of which forms a valve seat; and an outwardly opening valve coöperating with said seat, said nipple and casing being secured together as by solder to thereby form a single unitary structure.

5. In a faucet, a tubular casing; a bead projecting inwardly from the wall of said casing; a nipple whereby said casing may be secured to a receptacle, the inner end of said nipple extending within said casing and having an outwardly projecting flange one surface of which is in engagement with said bead and the other surface of which forms a valve seat; an outwardly opening valve coöperating with said seat; a packing washer surrounding said nipple and adapted to engage the exterior surface of the receptacle to which the faucet is attached; and a seat for supporting said packing washer.

6. In a faucet, a tubular casing; a valve seat within said casing; a cap provided with a threaded opening and adapted to close the outer end of said casing; a discharge spout intermediate said valve seat and said cap; a valve coöperating with said seat and adapted to move outwardly therefrom and past said discharge spout; an operating handle having a threaded portion adapted to engage the threaded opening in said cap; and a stem of less diameter than said threaded portion and rigidly connected with said handle for supporting said valve, the distance from said valve seat to said discharge spout being greater than the length of the threaded portion of said operating handle.

This specification signed and witnessed this 23rd day of June A. D. 1908.

HENRY GREELEY CORDLEY.

Witnesses:
JOHN STEINHAUSER,
WILLIAM M. REIS.